United States Patent
Beckmann

(10) Patent No.: US 7,067,443 B1
(45) Date of Patent: Jun. 27, 2006

(54) MULTILAYER COMPOSITE BODY

(75) Inventor: Friedhelm Beckmann, Hiddenhausen (DE)

(73) Assignee: Moeller Tech GmbH, Bielefeld (DE)

( * ) Notice: Subject to any disclaimer, the term of this patent is extended or adjusted under 35 U.S.C. 154(b) by 0 days.

(21) Appl. No.: 09/379,215

(22) Filed: Aug. 23, 1999

Related U.S. Application Data

(63) Continuation of application No. PCT/DE98/00015, filed on Jan. 7, 1998.

(30) Foreign Application Priority Data

Feb. 21, 1997 (DE) .......................... 197 06 839

(51) Int. Cl.
*B32B 5/26* (2006.01)

(52) U.S. Cl. ...................... 442/241; 428/131; 428/156; 428/187; 428/304.4; 428/218; 428/233; 428/300.7; 442/94; 442/239; 442/286; 442/394

(58) Field of Classification Search ................ 428/131, 428/137, 156, 158, 187, 304.4, 300.7, 218, 428/233; 442/94, 239, 268, 286, 301, 302, 442/241, 394; 156/219
See application file for complete search history.

(56) References Cited

U.S. PATENT DOCUMENTS

| 4,269,884 | A | * | 5/1981 | Della Vecchia et al. .... 428/131 |
| 5,614,285 | A | * | 3/1997 | Gardill ........................ 428/156 |
| 5,942,321 | A | * | 8/1999 | Romesberg et al. ..... 428/300.7 |

OTHER PUBLICATIONS

Lewis, Richard. Hawley's Condensed Chemical Dictionary, 13th edition. RJohn Wiley & Sons, INC. 1997. p. 899.*
Majory L. Joseph. Textile Science. CBS College Publishing. 1986. pp. 161–162, 313.*

* cited by examiner

*Primary Examiner*—Arti R. Singh
(74) *Attorney, Agent, or Firm*—Laurence A. Greenberg; Werner H. Stemer; Ralph E. Locher

(57) ABSTRACT

A multilayer composite body includes thermoplastic layers and layers of natural fibers bound with thermoplastic synthetic material. The composite body has at least one reinforcing layer made of an open-cell fabric of melting fibers. The reinforcing layer is penetrated on one or both sides by the melting thermoplastic synthetic material of adjoining natural-fiber layers and is integrated there for reinforcement. The reinforcing layer can also be disposed in addition or only between natural-fiber and pure thermoplastic layers or between thermoplastic layers. Such a composite body has excellent mechanical properties, in particular with regard to bending stress and impact resistance.

16 Claims, 2 Drawing Sheets

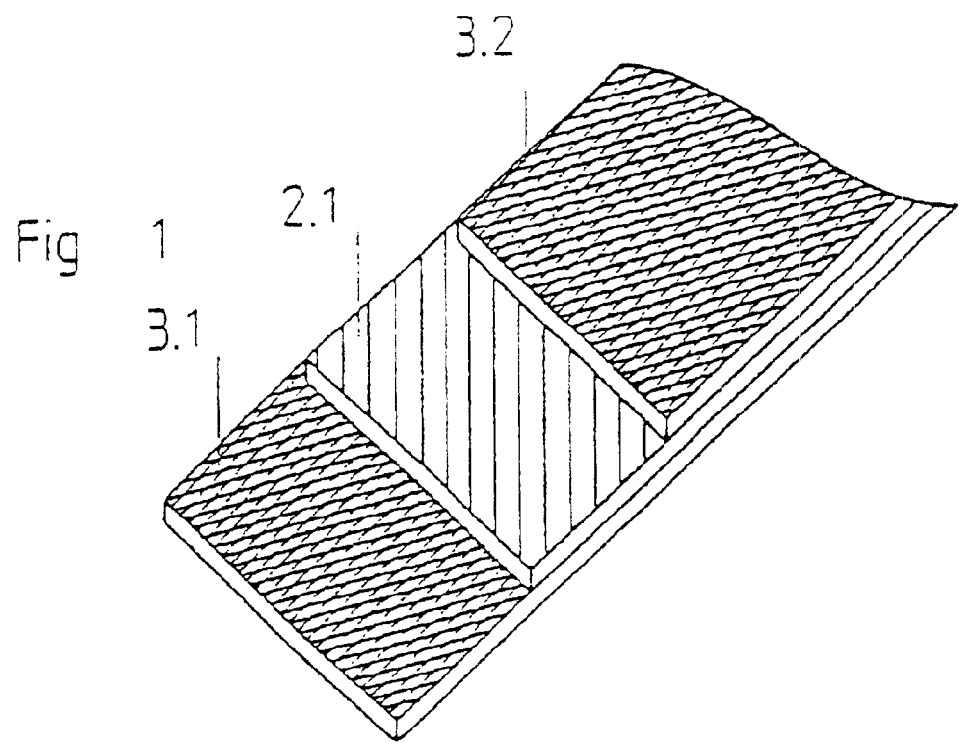
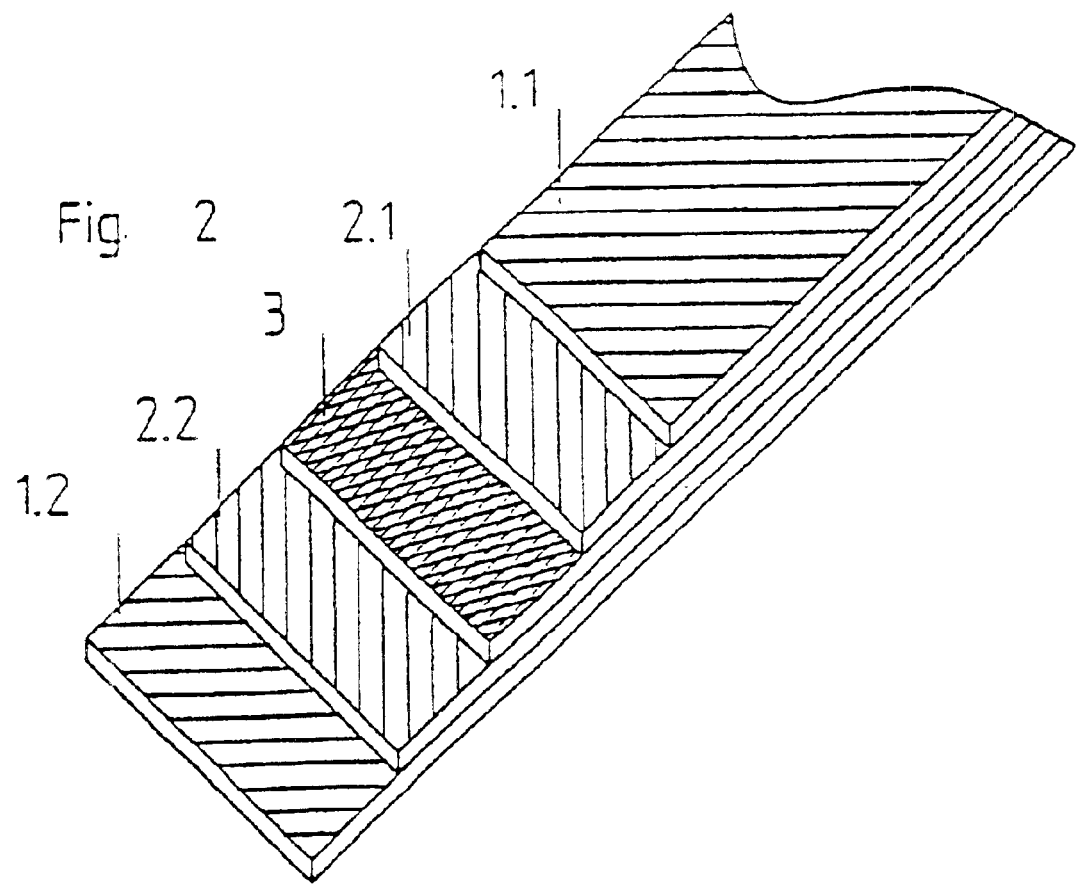

MULTILAYER COMPOSITE BODY

CROSS-REFERENCE TO RELATED APPLICATION

This application is a continuation of copending International Application No. PCT/DE98/00015, filed Jan. 7, 1998, which designated the United States.

BACKGROUND OF THE INVENTION

Field of the Invention

The invention relates to a multilayer composite body including thermoplastic layers and layers of natural fiber bound with thermoplastic synthetic materials, for the fabrication of components or preforms, especially for motor vehicles.

Components formed from natural fibers, for example jute, hemp, sisal, flax and the like, or from mixtures of natural fibers, are already known. In order to fabricate the components, the natural fibers are mixed with fibers of thermoplastic synthetic material or the natural fibers are impregnated directly with a thermoplastic bonding agent and preformed into fiber mats which are then brought to the required shape by pressing in a die at a molding temperature above the melting temperature of the synthetic material being used. After cooling and solidification of the synthetic material a rigid, solid component is obtained with the appropriate three-dimensional shape.

Due to the low thermal stability of the natural fibers which can suffer damage at high temperatures, the bonding agents which are used are in the form of synthetic fibers or impregnation thermoplastic or low-melting duroplastic synthetic materials such as polypropylene, polyethylene, ethylene vinyl acetate and the like, having a melting temperature which must not exceed or must be only slightly higher than 250° C. However, the mechanical properties which can be achieved with composite materials of that kind often do not satisfy strength requirements set for the respective components.

A one-piece multilayer composite body was already proposed in German Published, Non-Prosecuted Patent Application DE 44 03 977 A1 in order to raise the strength of components fabricated by using natural fibers and to improve molding characteristics of the starting material being formed of fiber mats. That composite body essentially is formed of a supporting layer with natural fibers embedded therein, and an outer layer of thermoplastic synthetic material covering it on each side with glass fibers bonded therein. In addition, that composite body made from combining-individual thermoplastic layers is covered at one outer surface with a layer of foam and a decorative layer of a fabric. With that construction and that configuration of layers it is not possible to achieve an intimate, one-piece bonding between the layers and, in particular, a high flexural strength and impact resistance which is often specifically demanded of motor vehicles.

SUMMARY OF THE INVENTION

It is accordingly an object of the invention to provide a multilayer composite body of synthetic material, fabricated with the use of natural fibers, which overcomes the hereinafore-mentioned disadvantages of the heretofore-known devices of this general type and which is constructed in such a way as to enable a component fabricated therefrom to meet specifications set for its mechanical properties, especially with respect to flexural strength and impact resistance.

With the foregoing and other objects in view there is provided, in accordance with the invention, a multilayer composite body for the production of components or preforms, especially for motor vehicles, comprising thermoplastic layers; natural fiber layers bonded with thermoplastic synthetic material; and at least one reinforcing insert adjacent the thermoplastic layers and the natural fiber layers, the at least one reinforcing insert having an open-pored fabric formed from fibers, the fabric penetrated or impregnated from at least one side by melting synthetic materials of the adjacent natural fiber layers and/or the adjacent thermoplastic layers and the natural fiber layers and/or the thermoplastic layers, integrated or bonded into the fabric for reinforcement.

Thus the basic concept of the invention resides in the configuration of a high-strength fabric melting towards the synthetic material becoming molten during the molding, into which fabric the molten synthetic material penetrates from both sides. As a result of the reinforcing effect of the fabric, the strength characteristics are considerably improved and at the same time an intimate bond is formed over the fabric insert between adjacent layers of low-melting synthetic materials with or without natural fibers.

Thus it is possible, through the use of the reinforcing inserts of fabric, to provide composite-body components which can be fabricated in a simple way and which have good mechanical properties, in particular a high flexural strength and impact resistance.

On one hand, each reinforcing insert is advantageously disposed between two layers of natural fiber bonded in thermoplastic synthetic material. This composite in particular enables outstanding strength characteristics to be achieved for the composite body.

On the other hand, however, it is also possible to fabricate composite bodies in which the reinforcing insert lies between a pure thermoplastic layer and a layer of natural fibers bonded with synthetic material, or it can even be disposed between two layers of thermoplastic.

In advantageous embodiments of the invention the composite body can also contain two or more reinforcing inserts of fabric. However, in each case the inserts are disposed between two layers containing a low-melting synthetic material.

In accordance with another feature of the invention, the synthetic material of the thermoplastic layers and the natural fiber layers has a melting temperature of <250° C.

In accordance with a further feature of the invention, the synthetic material of the thermoplastic layers and the natural fiber layers is selected from the group consisting of polyethylene, polypropylene and ethylene vinyl acetate.

In accordance with an added feature of the invention, the natural fiber layers contain natural fibers formed from the group consisting of flax, hemp, sisal, jute and mixtures thereof.

In accordance with an additional feature of the invention, the fibers of the fabric of the reinforcing insert are formed of melted synthetic materials selected from the group consisting of polyethylene terephthalate, polybutylene terephthalate, glass fibers, carbon fibers and a combination of different melted fibers.

In accordance with yet another feature of the invention, the at least one reinforcing insert is centrally disposed and has outer surfaces; the natural fiber layers are first and second natural fiber layers disposed at the outer surfaces of the at least one reinforcing insert and having outer surfaces;

the thermoplastic layers are first and second thermoplastic layers covering and bonded with the outer surfaces of the first and second natural fiber layers as an outer layer; and the thermoplastic synthetic bonding material of the natural fiber layers simultaneously penetrates the fibers of the fabric of the at least one reinforcing insert and the first and second thermoplastic layers.

In accordance with yet a further feature of the invention, the at least one reinforcing insert includes first, second and third reinforcing inserts; the first reinforcing insert is disposed between the first and second natural fiber layers; the second reinforcing insert is disposed between the first natural fiber layer and the first thermoplastic layer; the third reinforcing insert is disposed between the second natural fiber layer and the second thermoplastic layer; and the second and third reinforcing inserts are bonded into the thermoplastic material of the adjacent natural fiber and thermoplastic layers.

In accordance with yet an added feature of the invention, the thermoplastic layers are formed of a material selected from the group consisting of film material and fiber material becoming molten during molding of a component.

In accordance with yet an additional feature of the invention, the thermoplastic layers have a variable volume and form outer component surfaces, and at least one of molded-in functional elements and surface structures are disposed in the outer component surfaces and correspond to the variable volume.

In accordance with again another feature of the invention, the thermoplastic layers are self-colored.

In accordance with again a further feature of the invention, the thermoplastic layers have outer surfaces, and covering layers are bonded with the outer surfaces.

In accordance with a concomitant feature of the invention, the at least one reinforcing insert has a higher melting point than the thermoplastic.

Other features which are considered as characteristic for the invention are set forth in the appended claims.

Although the invention is illustrated and described herein as embodied in a multilayer composite body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, perspective view of a mat with an externally located reinforcing fabric on both sides;

FIG. 2 is a perspective view of an edge section of a natural fiber/thermoplastic fiber mat with a single reinforcing insert of open-pored fabric;

DESCRIPTION OF THE PREFERRED EMBODIMENTS

Figure 3:
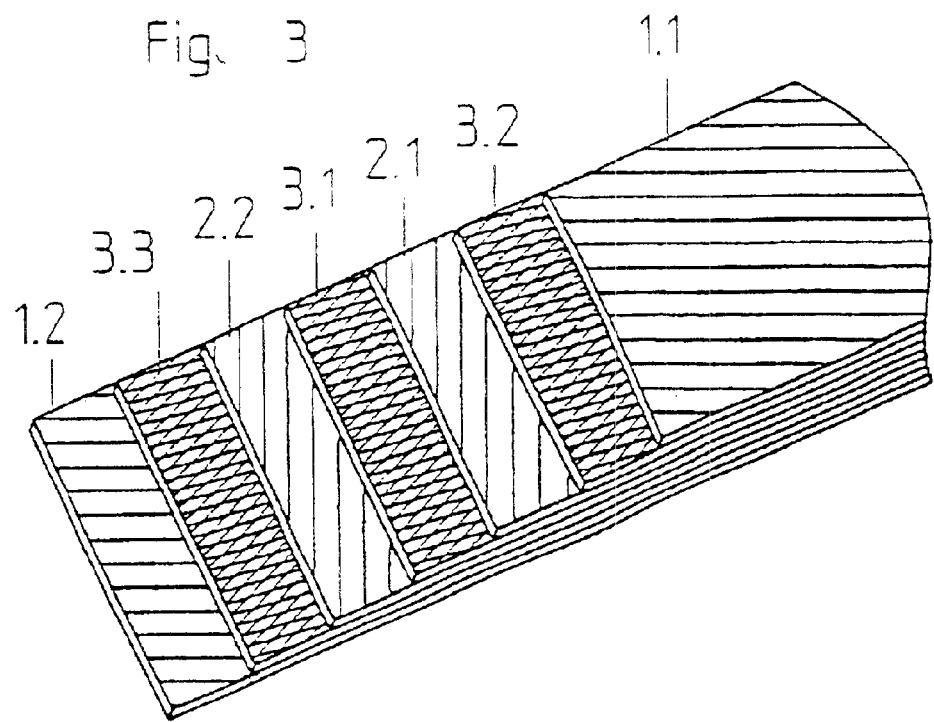
FIG. 3 is a perspective view of a further embodiment of a fiber mat with three reinforcing inserts for a composite body to be formed.

Referring now to the figures of the drawing in detail, it is noted that in order to make every layer visible in perspective views, fiber mats in exemplary embodiments shown herein are illustrated with a strip cut away from an edge of each individual strip relative to a strip lying adjacent it. A diagrammatic illustration of the fiber mat which forms a starting material for a composite body to be formed or a molded component is identical with that of a composite body.

In a basic embodiment according to FIG. 1, a natural fiber layer 2.1 is covered on each side by a respective reinforcing fabric 3.1, 3.2. According to FIG. 2, a fiber mat or composite body includes first and second thermoplastic layers of fibers 1.1 and 1.2 as outer layers respectively covering two sides of the composite body. Polypropylene, polyethylene or ethylene vinyl acetate may, for example, be used as the thermoplastic fiber material. A first and a second layer of natural fibers 2.1 and 2.2 are located adjacent an inner surface of each respective outer first and second thermoplastic layer 1.1 and 1.2. The natural fiber layers 2.1 and 2.2 are formed of natural fibers such as hemp, flax, jute, sisal and the like, or a mixture of natural fibers, which are impregnated with a bonding agent of thermoplastic synthetic material or mixed with corresponding fibers that form a composite with the bonding agent after molding.

A middle layer embedded between the two natural fiber layers 2.1 and 2.2 is a reinforcing insert 3 of open-structured fabric which is formed of a fiber material with a higher melting temperature than that of the thermoplastic bonding a agent used for the natural fiber layers 2.1 and 2.2. In the exemplary embodiment, the wide-pored fabric of the reinforcing insert 3 is formed of polyester fibers. It is also possible, for example, to use fibers of polybutylene terephthalate or carbon fibers or glass fibers or a combination of these or other high-melting fibers.

The fiber mat which is thus formed is then molded to the required composite body component, for example for use in motor vehicle manufacture. This is done in such a way that the fiber mat is heated to a temperature of approximately 200° C. in the melting temperature range of the thermoplastics being used and is pressed into a required shape.

The volume of the first and second thermoplastic layers 1.2 and 1.1 lying at the outer surfaces of the natural fiber layers 2.1 and 2.2 is selected in such a way that during the pressing process functional elements such as fixing strips, ribs or the like, or specific visually effective surface structures, can be formed at these layers. On the same way it is possible to provide special coloration of the first and second thermoplastic layers 1.1 and 1.2 for aesthetic reasons.

While the heated fiber mat is being pressed, the low-melting, molten thermoplastics of the natural fiber layers 2.1 and 2.2 penetrate into the wide-meshed fabric structure of the reinforcing insert 3 from both sides and coat the fabric of the reinforcing insert 3. A tight composite thus arises with the adjacent natural fiber layers 2.1 and 2.2 in which the fabric acts as a reinforcement. As a result, the mechanical properties of the component that is fabricated in this way are considerably improved, especially with respect to flexural strength and impact resistance.

FIG. 3 shows a second embodiment of a fiber mat for fabrication of components with further improved reinforcing properties as compared with the first embodiment, through the use of first, second and third reinforcing inserts 3.1, 3.2 and 3.3. The fiber mat which includes several layers is formed of a consecutive repeating sequence of a first thermoplastic layer 1.1, the second reinforcing insert 3.2, a first natural fiber layer 2.1, the first reinforcing insert 3.1, a second natural fiber layer 2.2, the third reinforcing insert 3.3 and a second thermoplastic layer 1.2.

Upon heating and pressing a fiber mat which is formed in this way from individual layers, the molten thermoplastic material of the first and second thermoplastic layers 1.1, 1.2 and the first and second natural fiber layers 2.1, 2.2 respectively penetrate from both sides into the open-pored fabric structure of the higher-melting-fiber reinforcing inserts 3.1, 3.2 and 3.3. The penetration thus forms a multilayer reinforcement of a sandwich-type one-piece composite body in the component which is formed in this way and contributes to a considerable increase in strength characteristics. Depending on the thickness of the outer layers of the composite body formed from the thermoplastic layers 1.1 and 1.2, specific functional elements and surface structures can also be formed at these layers during pressing.

Figure 4:
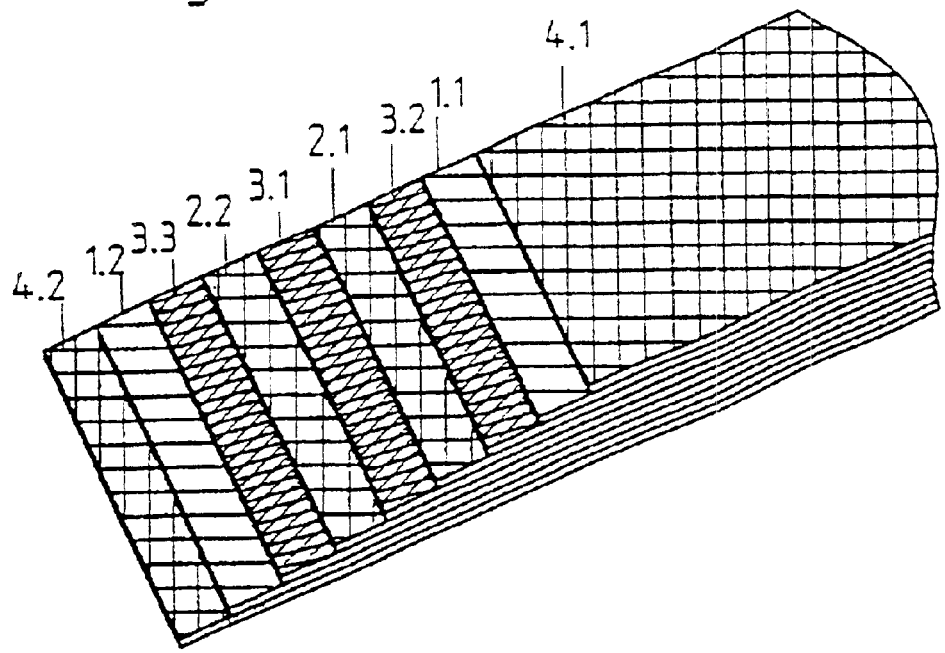
FIG. 4 is a perspective view of a fiber mat according to FIG. 2 but with a covering film disposed in addition on each side.

The embodiment according to FIG. 4 essentially corresponds to the embodiment described with regard to FIG. 3. However, in this case the outer surfaces of the fiber mat or the component being formed of a composite body are additionally provided with a covering film 4.1 and 4.2 or other decorative materials, e.g. for improving the visual characteristics.

I claim:

1. A multilayer composite body for the production of components or preforms, comprising:

thermoplastic layers each being a single layer and having synthetic materials;

natural fiber layers bonded with thermoplastic synthetic material; and at least one reinforcing insert adjacent to said thermoplastic layers and said natural fiber layers, said at least one reinforcing insert having an open-pored fabric formed from fibers, said fabric penetrated from at least one side by melted synthetic materials of at least one of said adjacent natural fiber layers and said adjacent thermoplastic layers integrating into and reinforcing said at least one of said adjacent natural fiber layers and said adjacent thermoplastic layers;

said thermoplastic layers forming outer surfaces of said multilayer composite body and forming at least one molded functional element exclusively on at least one of said outer surfaces, said functional element selected from the group consisting of a fixing strip and a rib.

2. The multilayer composite body according to claim 1, wherein said synthetic material of said thermoplastic layers and said natural fiber layers has a melting temperature of <250° C.

3. The multilayer composite body according to claim 1, wherein said synthetic material of said thermoplastic layers and said natural fiber layers is selected from the group consisting of polyethylene, polypropylene and ethylene vinyl acetate.

4. The multilayer composite body according to claim 1, wherein said natural fiber layers contain natural fibers formed from the group consisting of flax, hemp, sisal, jut and mixtures thereof.

5. The multilayer composite body according to claim 1, wherein:

said at least one reinforcing insert is centrally disposed and has outer surfaces;

said natural fiber layers are first and second natural fiber layers disposed at said outer surfaces of said at leas least one reinforcing insert and having outer surfaces;

said thermoplastic layers are first and second thermoplastic layers covering and bonded with said outer surfaces of said first and second natural fiber layers as an outer layer; and said thermoplastic synthetic bonding material of said natural fiber layers simultaneously penetrates said fibers of said fabric of said at least one reinforcing insert and said first and second thermoplastic layers.

6. The multilayer composite body according to claim 5, wherein:

said at least one reinforcing insert includes first, second and third reinforcing inserts;

said reinforcing insert is disposed between said first and second natural fiber layers;

said second reinforcing insert is disposed between said first natural fiber layer and said first thermoplastic layer;

said third reinforcing insert is disposed between said second natural fiber layer and said second thermoplastic layer; and said second and third reinforcing inserts are bonded into said thermoplastic material of said adjacent natural fiber and thermoplastic layers.

7. The multilayer composite body according to claim 1, wherein said thermoplastic layers are formed of a material selected from the group consisting of film material and fiber material becoming molten during molding of a component.

8. The multilayer composite body according to claim 1, wherein said thermoplastic layers are self-colored.

9. The multilayer composite body according to claim 1, wherein covering layers are bonded with said outer surfaces formed by said thermoplastic layers.

10. The multilayer composite body according to claim 1, wherein said at least one reinforcing insert has a higher melting point than said thermoplastic.

11. A motor vehicle component or preform produced from a multilayer composite, comprising:

thermoplastic layers each being a single layer add having synthetic materials;

natural fiber layers bonded with thermoplastic synthetic material; and at least one reinforcing insert adjacent to said thermoplastic layers and said natural fiber layers, said at least one reinforcing insert having an open-pored fabric formed from fibers, said fabric penetrated from at least one side by melted synthetic materials of at least one of said adjacent natural fiber layers and said adjacent thermoplastic layers integrating into and reinforcing said at least one of said adjacent natural fiber layers and said adjacent thermoplastic layers;

said thermoplastic layers forming outer surfaces of said multilayer composite body and forming at least one molded functional element exclusively on at least one of said outer surfaces, said functional element selected from the group consisting of a fixing strip and a rib.

12. The multilayer composite body according to claim 2, wherein said fibers of said fabric of said reinforcing insert are formed from a combination of said materials.

13. The multilayer composite body according to claim 1, wherein said outer surfaces are component surfaces.

14. The multilayer composite body according to claim 13, wherein said component surface is a surface structure.

15. The multilayer composite body according to claim 1, wherein said component is a molded-in functional element.

16. The multilayer composite body according to claim 1, wherein said component is a visually effective surface structure.

* * * * *